United States Patent

Knorr et al.

Patent Number: 6,040,349

Date of Patent: Mar. 21, 2000

[54] PRODUCTION OF RIGID POLYURETHANES FOAMS WITH REDUCED DENSITY

[75] Inventors: Gottfried Knorr, Schwarzheide; Udo Rotermund, Ortrand; Eva Baum, Schwarzheide; Holger Seifert, Hüde; Werner Wiegmann, Rahdem, all of Germany

[73] Assignee: BASF Aktiegesellschaft, Ludwigshafen, Germany

[21] Appl. No.: 09/038,388

[22] Filed: Mar. 11, 1998

[30] Foreign Application Priority Data

Mar. 11, 1997 [DE] Germany .............. 197 09 868

[51] Int. Cl.⁷ .................................... C08G 18/32
[52] U.S. Cl. ................. 521/131; 521/164; 521/167
[58] Field of Search ............... 521/164, 167, 521/131

[56] References Cited

U.S. PATENT DOCUMENTS

| | | |
|---|---|---|
| 5,096,933 | 3/1992 | Volkert et al. . |
| 5,428,077 | 6/1995 | Lamberts et al. . |
| 5,525,641 | 6/1996 | White, III et al. . |

FOREIGN PATENT DOCUMENTS

| | | |
|---|---|---|
| 719 807 | of 0000 | European Pat. Off. . |
| 0 421 269 A2 | 4/1991 | European Pat. Off. . |
| 0 708 127 A2 | 10/1995 | European Pat. Off. . |
| 195 46 461 A1 | 12/1995 | Germany . |

*Primary Examiner*—Morton Foelak
*Attorney, Agent, or Firm*—Fernando A. Borrego

[57] ABSTRACT

A process for producing rigid polyurethane foams with reduced density by reacting a) organic and/or modified organic polyisocyanates with
b) at least one higher-molecular-weight compound having at least two reactive hydrogen atoms and, if desired,
c) low-molecular-weight chain extenders and/or crosslinkers in the presence of
d) blowing agents,
e) catalysts and, if desired,
f) other auxiliaries and/or additives, is described, which comprises using, as blowing agent (d), a mixture of cyclopentane with at least one compound which is homogeneously miscible with cyclopentane selected from the class consisting of the alkanes and/or alkenes having 3 or 4 carbon atoms in the molecule and with the carbon dioxide produced from water and isocyanate, and using, as higher-molecular-weight compound (b) having at least two reactive hydrogen atoms, polyethers which contain aromatics and nitrogen.

The use of the rigid foams produced in this way as insulating material is also described.

15 Claims, No Drawings

PRODUCTION OF RIGID POLYURETHANES FOAMS WITH REDUCED DENSITY

The present invention relates to a process for producing rigid polyurethane (PUR) foams with low density and low thermal conductivity and to their use as insulating material.

Rigid PUR foams have been known for a long time and are used predominantly for heat- or cold-insulation, eg. in refrigeration equipment, in the building sector, for warm water storage and in long-distance heating pipes. An overview of the production and use of rigid PUR foams may be found in the specialist literature, for example in the monograph of J. H. Saunders and K. C. Frisch, High Polymers, Vol. XVI, Polyurethanes, Parts 1 and 2, Interscience Publishers, 1962 and 1964 respectively, or in Kunststoffhandbuch, Polyurethane, Vol. VII, Carl-Hanser-Verlag, Munich, Vienna, 1st, 2nd and 3rd Edition, 1966, 1983 and 1993 respectively.

Blowing agents used for producing these foams have until recently been fluorochlorohydrocarbons (FCHCs), especially trichlorofluoromethane. These FCHCs, because of their destructive effect on the earth's ozone layer, are having to be replaced by materials which do not have this potential to damage the ozone layer (Ozone Depletion Potential, ODP) and have a very low greenhouse effect (Global Warming Potential, GWP).

For these reasons, hydrocarbons have been proposed as the blowing agents of the future. Among the hydrocarbons, a leading role is being played by the isomers of pentane, which, because of their relatively low boiling points, are very suitable as blowing agents for producing rigid isocyanate-based foams. The use of pentane derivatives is already mentioned in the 3rd edition of Kunststoff-Handbuch, ed. G. Becker and D. Braun, Vol. 7, ed. G. Oertel, Carl Hanser Verlag, Munich, Vienna, 1993, eg. on page 115 ff.

It has been shown that cyclopentane gives foams of lower thermal conductivity than do n-pentane and isopentane (EP-A-0 421 269) and thus that cyclopentane or its mixtures with materials of boiling point below 35° C. are the best halogen-free blowing agent types known at present.

In the last 2 years, cyclopentane has become established in the European refrigeration industry, but for reasons of cost and their somewhat stronger blowing effect, n-pentane or isopentane and other low-boiling hydrocarbons are also used as blowing agents, although these give poorer thermal conductivity values than those given by cyclopentane.

Although the use of these hydrocarbons, including cyclopentane, gives foams which can be used very successfully for insulation purposes, these products still have disadvantages compared with those blown by FCHCs, in particular with respect to the density which is achievable at adequate compressive strength and dimensional stability. The use of cyclopentane with the carbon dioxide produced from water and isocyanate gives free-foamed densities of about 30 kg/m$^3$ in the laboratory, so that eg. for refrigerators a foam density of about 36 kg/m$^3$ is required in order to produce foams having the required compressive strength and dimensional stability.

This means an increase of the foam density of 10% in comparison with rigid foams blown using trichlorofluoromethane and thus higher production costs, resulting from the use of more material, in the manufacture of eg. refrigeration equipment. The partial vapor pressure of cyclopentane at room temperature does not allow its proportion in the cell gas to be more than 38%, so that an increase in the cyclopentane proportion gives condensation of cyclopentane in the cells and ceases to make any contribution to a lowering of the density of the foam.

A possible lowering of the foam density of rigid foams blown using cyclopentane by reducing the degree of overfill always gives poorer compressive strength and dimensional stability, especially in long-term tests, so that usable foams of good quality cannot be produced in this way.

EP-A-0 421 269 has already proposed mixtures of cyclopentane, cyclohexane and low-boiling compounds which are homogeneously miscible with cyclopentane and/or cyclohexane and have a boiling point of below 35° C., selected from the class consisting of the alkanes or cycloalkanes having 4 or fewer carbon atoms. A lowering of the density in comparison with that of rigid foams blown purely by cyclopentane did not, however, occur. EP-A-0 610 752 likewise uses blowing agent mixtures of cycloalkanes and linear or branched alkanes. The advantages mentioned are decreased thermal conductivity and good machine-processibility, but a lowering of the free-foamed density and thus of the foam density of resultant moldings was not achieved or described.

It is an object of the present invention to produce rigid PUR foams which do not have the disadvantages described and whose compressive strength and long-term dimensional stability are in particular maintained at low densities, so that when they are used there is no necessity for the high foam density which would otherwise be required.

We have found that this object is achieved, surprisingly, by combining a blowing agent mixture consisting of cyclopentane with at least one compound which is homogeneously miscible with cyclopentane selected from the class consisting of the alkanes and/or alkenes having 3 or 4 carbon atoms in the molecule and with the carbon dioxide produced from water and isocyanate and using, as higher-molecular-weight compounds having at least two reactive hydrogen atoms, polyethers which contain aromatics and nitrogen.

The invention therefore provides a process for producing rigid PUR foams with reduced density by reacting a) organic and/or modified organic polyisocyanates with b) at least one higher-molecular-weight compound having at least two reactive hydrogen atoms and, if desired, c) low-molecular-weight chain extenders and/or crosslinkers in the presence of d) blowing agents, e) catalysts and, if desired, f) other auxiliaries and/or additives, which comprises using, as blowing agent (d), a mixture of cyclopentane with at least one compound which is homogeneously miscible with cyclopentane selected from the class consisting of the alkanes and/or alkenes having 3 or 4 carbon atoms in the molecule and with the carbon dioxide produced from water and isocyanate, and using, as higher-molecular-weight compound (b) having at least two reactive hydrogen atoms, polyethers which contain aromatics and nitrogen.

The invention also provides the use, as insulation material, of rigid PUR foams produced in this way.

By using, in component (b), polyethers which contain aromatics and nitrogen and by using the blowing agent mixture described, it is possible, surprisingly, to achieve a considerable lowering of the free-foamed density and thus of the foam density of the resultant moldings or objects without the disadvantages described of poorer compressive strength and dimensional stability, especially in long-term tests.

It is well known that the chemical structure of the polyols influences the properties of the foam. Different starter molecules and different molecular weights of the resultant polyols give particular properties after the reaction with isocyanates, including the compressive strength and dimensional stability of rigid foams. It was not to be expected, however, that changing the polyol component would achieve a lowering of the foam density of moldings and that this would not result in poorer physical and mechanical properties at the lower densities.

Blowing agents having higher vapor pressures give lower foam densities, but an undesirable outcome of this is that certain properties, eg. the compressive strength, become poorer.

As component (b), use is made of polyethers which contain aromatics and nitrogen, if desired in association with other higher-molecular-weight compounds having at least two reactive hydrogen atoms. The polyethers which contain aromatics and nitrogen are in particular those whose preparation is based on aromatic N,N- and N,N'-dialkyl-substituted diamines, such as 2,3-, 3,4-, 2,4- and 2,6-tolylenediamine and 4,4'-, 2,4'- and 2,2'-diaminodiphenylmethane, polyphenylmethane polyamine or on mixtures of the compounds mentioned. It is advantageous to use polyethers initiated using tolylenediamine and/or polyphenylmethane polyamine and having a hydroxyl number of from 300 to 600 mg KOH/g in an amount of preferably from 5 to 25% by weight, particularly preferably from 13 to 18% by weight, based on the total amount of the foam.

The other higher-molecular-weight compounds having at least two reactive hydrogen atoms and which may, if desired, be used in association with the polyethers which contain aromatics and nitrogen, are further described below. The proportion here of the polyethers which contain aromatics and/or nitrogen and which are to be used according to the invention, based on the entire component (b), is at least 15% by weight, preferably from 30 to 50% by weight.

The blowing agents according to the invention are a mixture of cyclopentane with at least one compound which is homogeneously miscible with cyclopentane selected from the class consisting of the alkanes and/or alkenes having 3 or 4 carbon atoms in the molecule and water.

The compounds which are homogeneously miscible with cyclopentane selected from the class consisting of the alkanes and/or alkenes having 3 or 4 carbon atoms in the molecule are preferably propane, n-butane, isobutane, cis-2-butene and/or trans-2-butene. These compounds may he used individually or in mixtures with one another. It is advantageous to use cost-effective industrially available mixtures of propane and butane. n-Butane and isobutane are particularly preferred.

Mixtures of butane and butene may, however, also be used.

The cyclopentane is preferably used in an amount of from 0.1 to 10% by weight, particularly preferably from 3 to 7% by weight and the alkanes and/or alkenes having 3 or 4 carbon atoms in the molecule are preferably used in an amount of from 0.1 to 6% by weight, particularly preferably from 0.1 to 3% by weight, based in each case on the entire amount of the foam.

Besides the blowing agent components described, water is used as chemical blowing agent. The water reacts with the isocyanate groups of component (a) to give carbon dioxide. The water is preferably added to component (b) in an amount of from 0.5 to 5% by weight, based on the weight of component (b). Water may also be added together with the other blowing agents to be used according to the invention.

The blowing agent mixture according to the invention may be prepared separately by prior mixing of the components mentioned. The blowing agent mixture is then added in a conventional manner preferably to the polyol component described below. It is also possible to meter in the hydrocarbon components individually into the product stream, preferably into the polyol component, immediately before passing to the mixing head for the mixing of polyol component and isocyanate component. It is also possible to meter into a specific multicomponent mixing head. The hydrocarbons are handled in a known manner using pumps, metering apparatus and storage vessels.

The rigid PUR foams are produced in a manner known per se by reacting a) organic and/or modified organic polyisocyanates with b) at least one higher-molecular-weight compound having at least two reactive hydrogen atoms and, if desired, c) low-molecular-weight chain extenders and/or crosslinkers in the presence of d) blowing agents, e) catalysts and, if desired, f) other auxiliaries and/or additives.

For producing the rigid PUR foams for the novel process, use is made, other than of the specific blowing agent mixture (d) and besides the polyethers described above which contain aromatics and nitrogen, of the formative components known per se, which are individually described below:

a) Suitable organic and/or modified organic polyisocyanates are the aliphatic, cycloaliphatic, araliphatic and preferably aromatic polyfunctional isocyanates known per se, as described, for example, in EP-A-0 421 269 (column 4, line 49, to column 6, line 22) or in EP-A-0 719 807 (column 2, line 53, to column 4, line 21).

Materials which have proven especially useful are diphenylmethane diisocyanate isomer mixtures or raw MDI having a content of diphenylmethane diisocyanate isomers of from 33 to 55% by weight and polyisocyanate mixtures containing urethane groups and based on diphenylmethane diisocyanate having an NCO content of from 15 to 33% by weight.

b) The compounds having at least two hydrogen atoms which are reactive to isocyanates according to the invention are the polyethers described above which contain aromatics and nitrogen. Besides these, other compounds having at least two hydrogen atoms which are reactive to isocyanates may be used, suitable compounds being those which have two or more reactive groups, in the molecule, selected from the class consisting of OH, SH, NH, $NH_2$ and acid CH.

It is expedient to use compounds having a functionality of from 2 to 8, preferably from 2 to 6, and a mean molecular weight of from 300 to 8000, preferably from 400 to 4000. Examples of materials which have proven useful are polyether polyamines and/or preferably polyols selected from the class consisting of the polyether polyols, polyester polyols, polythioether polyols, polyesteramides, polyacetals containing hydroxyl groups, aliphatic polycarbonates containing hydroxyl groups and mixtures of at least two of the polyols mentioned. Use is preferably made of polyester polyols and/or polyether polyols. The hydroxyl number of the polyhydroxy compounds here is generally from 100 to 850 and preferably from 200 to 600. Further details concerning the compounds which may be used can be seen, for example, in EP-A-0 421 269 (column 6, line 23, to column 10, line 5) or EP-A-0 719 807 (column 4, line 23, to column 7, line 55).

c) The rigid PUR foams may be produced with or without the additional use of chain extenders and/or crosslinkers. The addition of chain extenders, crosslinkers or, if desired, also of mixtures of these may be advantageous, however, for modifying the mechanical properties, eg. the rigidity. The chain extenders and/or crosslinkers which are used are diols and/or triols having molecular weights of below 400, preferably from 60 to 300. Aliphatic, cycloaliphatic and/or araliphatic diols having from 2 to 14, preferably from 4 to carbon atoms are preferred. Further details concerning these and other compounds which may be used can be found, for example, in EP-A-0 421 269 (column 10, lines 6 to 48).

If chain extenders, crosslinkers or mixtures of these are used for producing the rigid foams, these are expediently used in an amount of from 0 to 20% by weight, preferably from 2 to 8% by weight, based on the weight of formative component (b).

d) According to the invention, the blowing agent mixture described above is used for producing the rigid PUR foams.

e) The catalysts (e) used for producing the rigid PUR foams are in particular compounds which greatly accelerate the reaction of the compounds of component (b) containing reactive hydrogen atoms, in particular hydroxyl groups and, if used, (c), with the organic, modified or unmodified polyisocyanates (a). By means of suitable catalysts (e), the isocyanate groups may also be induced to react with one another, however, giving, besides the adducts of isocyanates (a) with the compounds (b) having groups with active hydrogen, preferably isocyanurate structures.

The catalysts are therefore in particular materials which accelerate the reactions of the isocyanates, in particular the formation of urethanes, ureas and isocyanurates.

The catalysts are therefore in particular materials which accelerate the reactions of the isocyanates, in particular the formation of urethanes, ureas and isocyanurates.

Preferred compounds for this purpose are tertiary amines, tin compounds and bismuth compounds, alkali metal carboxylates, alkaline-earth metal carboxylates, quaternary ammonium salts, s-hexahydrotriazines and tris(dialkylaminomethyl)phenols.

Further details concerning catalysts which may be used can be found, for example, in EP-A-0 719 807 (column 9, lines 5 to 56).

f) Auxiliaries and/or additives (f) may also moreover be is incorporated into the reaction mixture for producing the rigid PUR foams. Examples of these are surfactants, foam stabilizers, cell regulators, flame retardants, fillers, dyes, pigments, agents to prevent hydrolysis and substances with fungistatic or bacteriostatic effect. Further details concerning compounds which may be used are seen, for example, in EP-A-0 421 269 (column 12, line 55, to column 14, line 16) or EP-A-0 719 807 (column 9, line 58, to column 13, line 17).

Further details concerning starting materials mentioned above and other conventional starting materials can be found in the technical literature, for example in the monograph of J. H. Saunders and K. C. Frisch, High Polymers, Vol. XVI, Polyurethanes, Parts 1 and 2, Interscience Publishers, 1962 and 1964 respectively, or in Kunststoffhandbuch, Polyurethane, Vol. VII, Carl-Hanser-Verlag, Munich, Vienna, 1st, 2nd and 3rd Edition, 1966, 1983 and 1993 respectively.

For producing the rigid PUR foams, the organic and/or modified organic polyisocyanates (a), higher-molecular-weight compounds having at least two reactive hydrogen atoms (b) and, if desired, chain extenders and/or crosslinkers (c) are reacted in amounts calculated such that the equivalence ratio of NCO groups of the polyisocyanates (a) to the total of the reactive hydrogen atoms of components (b) and, if used, (c) is from 0.85 to 1.75:1, preferably from 1.0 to 1.3:1 and in particular from 1.1 to 1.2:1. If the isocyanate-based rigid foams contain, at least to some extent, isocyanurate groups in their structure, a ratio of NCO groups in the polyisocyanates (a) to the total of the reactive hydrogen atoms of component (b) and, if used, (c) of from 1.5 to 60:1, preferably from 3 to 8:1, is usually used.

The rigid foams are advantageously produced by the one-shot process, for example using the high-pressure or low-pressure method in open or closed molds, for example metallic molds. It has proven especially advantageous to operate with the two-component process and to combine the formative components (b), (d), (e) and, if used, (c) and (f) in the component (A) and to use the organic polyisocyanates and/or modified polyisocyanates (a) or mixtures of the abovementioned polyisocyanates and, if desired, blowing agents (d) as the component (B), often termed the isocyanate component.

The starting components are mixed at from 15 to 80° C., preferably from 20 to 30° C., and introduced into an open mold or, if desired, under elevated pressure into a closed mold which may, if desired, be temperature-controlled.

The mold temperature is expediently from 20 to 110° C., preferably from 30 to 60° C., and in particular from 45 to 50° C.

The rigid PUR foams produced by the use according to the invention of polyethers which contain aromatics and nitrogen, as higher-molecular-weight compounds having at least two reactive hydrogen atoms, combined with the blowing agent mixture described, preferably have densities of from 25 to 40 kg/m$^3$. The compressive strengths determined for these reduced densities correspond to those of the rigid foams of the prior art having higher densities. The dimensional stabilities, especially in long-term tests, likewise show no disadvantages when comparison is made with conventional rigid foams having higher densities.

The products are preferably used as insulating material in the building and refrigeration appliances sectors. They are used in particular as interlayer for sandwich components or for foam-filling of the casings of refrigerators and freezer chests.

The invention is further described in the following working examples:

COMPARATIVE EXAMPLES 1–3 AND WORKING EXAMPLES 4–7

The formulations given in the table below were converted to rigid PUR foams.

The characteristic properties, such as free-foamed density, molding density, compressive strength and dimensional stability, were then determined.

The compressive strength was measured according to DIN 53421 in a direction perpendicular to the direction of foaming.

The long-term dimensional stability was determined on tubes of dimension 5×5×5 cm which had been subjected to a constant load of 0.05 N/mm$^2$ at 22±2° C. for 30 days. The load was applied in the direction of foaming.

The results of the tests are given in the lower part of the table and show the good level of physical and mechanical properties of the foams having lower density when comparison is made with the foods of the prior art.

TABLE

| Example | OH number [mg KOH/g] | | 1 (Comparative Example) | 2 (Comparative Example) | 3 (Comparative Example) | 4 | 5 | 6 | 7 |
|---|---|---|---|---|---|---|---|---|---|
| Component A | | | | | | | | | |
| Polyetheralcohol based on sucrose/propylene oxide | 490 | pbw | 60 | 60 | 30 | 30 | 34.5 | 34.5 | 24.5 |
| Polyetheralcohol based on bisphenol A/diethanol-amine/propylene oxide | 530 | pbw | 15 | 15 | 15 | 15 | — | — | — |
| Polyetheralcohol based on tolylenediamine/ethylene oxide/propylene oxide | 390 | pbw | — | — | 30 | 30 | 20 | — | 30 |
| Polyetheralcohol based on diphenylmethanedi-amine/ethylene oxide/propylene oxide | 380 | pbw | — | — | — | — | 20 | 40 | 20 |
| Polypropylene glycol | 250 | pbw | 7 | 7 | 7 | 7 | 7 | 7 | 7 |
| Silicone foam stabilizer B8467 (Goldschmidt) | | pbw | 2 | 2 | 2 | 2 | 2 | 2 | 2 |
| Dimethylcyclohexylamine | | pbw | 2.5 | 2.5 | 2.5 | 2.5 | 3 | 3 | 3 |
| Water | | pbw | 2 | 2 | 2 | 2 | 2 | 2 | 2 |
| Cyclopentane | | pbw | 11.5 | 9.2 | 11.5 | 9.2 | 9.2 | 9.2 | 9.2 |
| n-Butane | | pbw | — | — | — | 2.3 | — | — | — |
| Isobutane | | pbw | — | 2.3 | — | — | — | — | 2.3 |
| cis/trans-2-Butene | | pbw | — | — | — | — | 2.3 | — | — |
| trans/trans-2-Butene | | pbw | — | — | — | — | — | 2.3 | — |
| Component B | | | | | | | | | |
| MDI raw product, NCO content 31.5% by weight | | pbw | 150 | 150 | 140 | 140 | 130 | 130 | 125 |
| Free-foamed density | | kg/m$^3$ | 30.5 | 28.0 | 30.0 | 27.5 | 27.5 | 27.0 | 27.0 |
| Molding density | | kg/m$^3$ | 36.7 | 33.5 | 36.0 | 33.0 | 33.0 | 33.0 | 33.0 |
| Compressive strength | | N/mm$^2$ | 0.13 | 0.10 | 0.13 | 0.13 | 0.13 | 0.13 | 0.14 |
| Dimensional stability | | % | 16 | 15 | 14 | 8 | 8 | 9 | 8 | pbw = parts by weight

We claim:

1. A process for producing rigid polyurethane foams having reduced density comprising reacting
   a) organic and/or modified organic polyisocyanates with
   b) at least one higher-molecular-weight compound having at least two reactive hydrogen atoms and, optionally,
   c) low-molecular-weight chain extenders and/or crosslinkers
in the presence of
   d) blowing agent
   e) catalysts and, optionally,
   f) other auxiliaries and/or additives,
wherein the blowing agent (d) comprises a mixture of cyclopentane, at least one compound which is homogeneously miscible with cyclopentane selected from the group consisting of alkanes and alkenes having 3 or 4 carbon atoms in the molecule, and carbon dioxide produced from water and isocyanate, and wherein the higher-molecular-weight compound (b) having at least two reactive hydrogen atoms comprise polyethers which contain aromatics and nitrogen.

2. A process as claimed in claim 1, wherein the blowing agent mixture contains propane, n-butane, isobutane, cis-trans-2-butene and/or trans-trans-2-butene.

3. A process as claimed in claim 1, wherein cyclopentane is used in an amount of from 0.1 to 10% by weight and the alkanes and/or alkenes having 3 or 4 carbon atoms in the molecule are used in an amount of from 0.1 to 6% by weight, based in each case on the entire amount of the foam.

4. A process as claimed in claim 1, wherein the polyethers which contain aromatics and nitrogen are polyethers initiated using tolylenediamine and/or polyphenylmethane polyamine.

5. A process as claimed in claim 1, wherein the hydroxyl number of the polyethers which contain aromatics and nitrogen is from 300 to 600 mg KOH/g.

6. A process as claimed in claim 1, wherein the polyethers which contain aromatics and nitrogen are used in an amount of from 5 to 25% by weight, based on the total amount of the foam.

7. A rigid polyurethane foam produced in accordance with the process as claimed in claim 1 which are used as insulating material in the building and refrigeration appliances sectors.

8. A process for producing a polyurethane foam comprising:
   providing a higher-molecular-weight compound having at least two reactive hydrogen atoms comprising polyethers containing aromatics and nitrogen;
   reacting an organic and/or modified organic polyisocyanate with said compound and, optionally, a low-molecular-weight chain extender and/or crosslinker in the presence of a blowing agent, catalyst and, optionally, other auxiliaries and/or additives; and
   foaming the reaction mixture to form the polyurethane foam such that said polyurethane foam exhibits improved long-term dimensional stability when subjected to a constant load of 0.05 N/mm$^2$ at 22±2° C. for 30 days;
   wherein the blowing agent comprises a blend of cyclopentane, at least one compound which is homogeneously miscible with cyclopentane selected from the group consisting of alkanes and alkenes having 3 or 4 carbon atoms in the molecule and mixtures thereof, and carbon dioxide produced from water and isocyanate.

9. A process as claimed in claim 8, wherein the compound which is homogeneously miscible with cyclopentane comprises propane, n-butane, isobutane, cis-trans-2-butene, trans-trans-2-butene or a mixture thereof.

10. A process as claimed in claim 8, wherein the blowing agent comprises cyclopentane in an amount of from 0.1 to 10 percent by weight and the homogeneously miscible compound in an amount of from 0.1 to 6 percent by weight, based on the weight of the foam.

11. A process as claimed in claim 8, wherein the higher molecular weight compound (b) comprises a polyether initiated using tolylenediamine and/or polyphenylmethane polyamine.

12. A process as claimed in claim 8, wherein the hydroxyl number of the polyethers which contain aromatics and nitrogen is from 300 to 600 mg KOH/g.

13. A process as claimed in claim 8, wherein the polyether is present in an amount of from 5 to 25 percent by weight, based on the total weight of the foam.

14. A process for producing a polyurethane foam comprising:

provided a higher-molecular-weight compound having at least two reactive hydrogen atoms consisting essentially of polyethers containing aromatics and nitrogen;

reacting an organic and/or modified organic polyisocyanate with said compound and, optionally, a low-molecular-weight chain extender and/or crosslinker in the presence of a blowing agent, catalyst and, optionally, other auxiliaries and/or additives; and foaming the reaction mixture to form the polyurethane foam such that said polyurethane foam exhibits improved long-term dimensional stability when subjected to a constant load of 0.05 N/mm$^2$ at 22±2° C. for 30 days;

wherein the blowing agent comprises a blend of cyclopentane, at least one compound which is homogeneously miscible with cyclopentane selected from the group consisting of alkanes and alkenes having 3 or 4 carbon atoms in the molecule and mixtures thereof, and carbon dioxide produced from water and isocyanate.

15. A process as claimed in claim 14, wherein the blowing agent consists of a blend of cyclopentane; propane, n-butane, isobutane, cis-trans-2-butene, trans-trans-2-butene or a mixture thereof; and carbon dioxide produced from water and isocyanate.

\* \* \* \* \*